(12) United States Patent
Danzig et al.

(10) Patent No.: US 8,290,881 B2
(45) Date of Patent: *Oct. 16, 2012

(54) COMPUTER-IMPLEMENTED METHOD AND APPARATUS TO ALLOCATE REVENUE FROM A DERIVED DIGITAL COMPONENT

(75) Inventors: Matt Danzig, Menlo Park, CA (US); William David Harvey, Palo Alto, CA (US); Vernon Mervin Guymon, III, Menlo Park, CA (US); Eric Nathan Ries, Palo Alto, CA (US); Marcus Gosling, San Francisco, CA (US)

(73) Assignee: IMVU, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/050,237

(22) Filed: Mar. 17, 2011

(65) Prior Publication Data

US 2011/0167017 A1 Jul. 7, 2011

Related U.S. Application Data

(63) Continuation of application No. 11/035,926, filed on Jan. 13, 2005, now Pat. No. 7,912,793.

(51) Int. Cl.
*G06Q 99/00* (2006.01)
(52) U.S. Cl. ... 705/400; 705/1.1; 705/14.31; 705/14.39; 709/219
(58) Field of Classification Search ............... 705/1.1, 705/14.31, 400, 14.39; 369/30.06; 709/219
See application file for complete search history.

(56) References Cited

U.S. PATENT DOCUMENTS

| 5,880,731 | A | | 3/1999 | Liles et al. |
| 5,956,038 | A | | 9/1999 | Rekimoto |
| 6,041,316 | A | * | 3/2000 | Allen .............................. 705/52 |
| 6,069,622 | A | | 5/2000 | Kurlander |
| 6,147,692 | A | | 11/2000 | Shaw et al. |
| 6,219,045 | B1 | | 4/2001 | Leahy et al. |
| 6,268,872 | B1 | | 7/2001 | Matsuda et al. |
| 6,307,568 | B1 | | 10/2001 | Rom |

(Continued)

FOREIGN PATENT DOCUMENTS

WO WO 2006/076385 7/2006

(Continued)

OTHER PUBLICATIONS

Castronova, Edward, "The Price of 'Man' and 'Woman': A Hedonic Pricing Model of Avatar Attributes in a Synthetic World", Jun. 2003, CESIFO Working Paper No. 957, category 4: Labour Markets, 44 pgs.*

(Continued)

*Primary Examiner* — John Hayes
*Assistant Examiner* — Freda A Nelson
(74) *Attorney, Agent, or Firm* — Salter IP Law; Jim H. Salter

(57) ABSTRACT

A computer-implemented hierarchical revenue model to manage revenue allocations among derived product developers in a networked system. The model includes providing a first revenue value associated with a first digital component, providing a second revenue value associated with a second digital component, and combining the first revenue value with a second revenue value to produce a third revenue value associated with the second digital component, the second digital component including at least a portion, of the first digital component.

20 Claims, 15 Drawing Sheets

U.S. PATENT DOCUMENTS

| | | | |
|---|---|---|---|
| 6,320,583 B1 | 11/2001 | Shaw et al. | |
| 6,453,294 B1 | 9/2002 | Dutta et al. | |
| 6,522,333 B1 | 2/2003 | Hatlelid et al. | |
| 6,699,123 B2 | 3/2004 | Matsuura et al. | |
| 6,784,901 B1 | 8/2004 | Harvey et al. | |
| 6,961,714 B1* | 11/2005 | LeVine | 705/51 |
| 7,006,098 B2 | 2/2006 | Bickmore et al. | |
| 7,065,711 B2 | 6/2006 | Hata et al. | |
| 7,188,088 B2* | 3/2007 | Iwata et al. | 705/59 |
| 7,318,036 B2* | 1/2008 | Kim et al. | 705/14.31 |
| 2002/0099564 A1 | 7/2002 | Kim et al. | |
| 2002/0169700 A1* | 11/2002 | Huffman et al. | 705/35 |
| 2003/0014423 A1* | 1/2003 | Chuah et al. | 707/102 |
| 2004/0179037 A1 | 9/2004 | Blattner et al. | |
| 2004/0179038 A1 | 9/2004 | Blattner et al. | |
| 2004/0179039 A1 | 9/2004 | Blattner et al. | |
| 2004/0221224 A1 | 11/2004 | Blattner et al. | |
| 2005/0137015 A1 | 6/2005 | Rogers et al. | |
| 2006/0026265 A1* | 2/2006 | Russell et al. | 709/219 |
| 2006/0031128 A1* | 2/2006 | Lamitie | 705/26 |
| 2007/0247979 A1* | 10/2007 | Brillon et al. | 369/30.06 |

FOREIGN PATENT DOCUMENTS

WO  WO2007/041013  4/2007

OTHER PUBLICATIONS

Giambruno, Mark, "3D Paper Dolls Zygote Mix and Match Prebuilt Human Bodies", Jan. 1998, v 4, n 1, p. 56 (4 pgs).*

Castronova, Edward, "The Price of 'Man' and 'Woman': A Hedonic Pricing Model of Avatar Attributes in a Synthetic World", 2003 CESIFO Working Paper No. 957, category 4: Labour Markets, 44 pgs.

Giambruno, Mark "3D Paper dolls Zygote Mix and Match Prebuilt Human Bodies", Jan. 1998, v 4, n 1, p. 56 (4 pgs).

* cited by examiner

FIG. 2
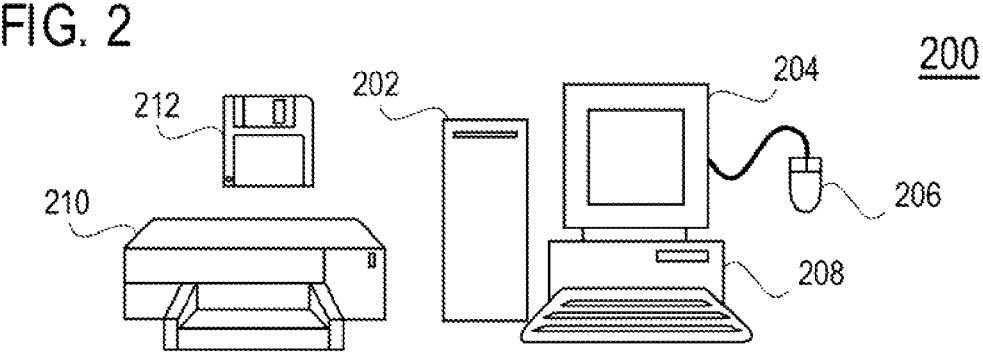
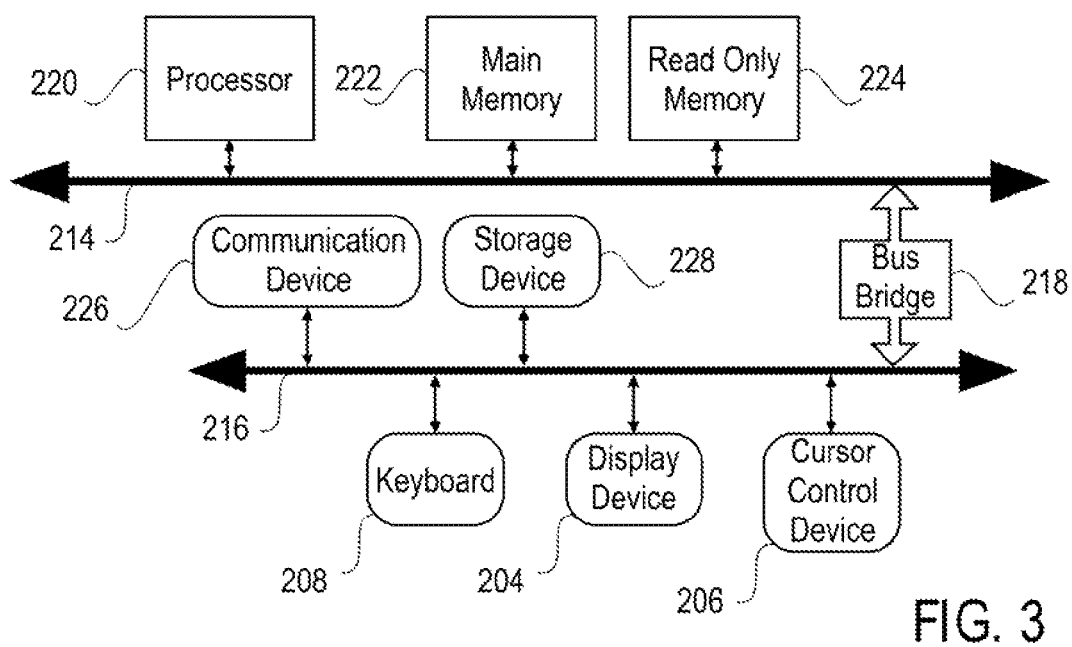
FIG. 3

FIG. 16

COMPUTER-IMPLEMENTED METHOD AND APPARATUS TO ALLOCATE REVENUE FROM A DERIVED DIGITAL COMPONENT

PRIORITY APPLICATION

This is a continuation patent application of patent application, Ser. No. 11/035,926; filed Jan. 13, 2005 now U.S. Pat. No. 7,912,793 by the same applicant. This present patent application draws priority from the referenced co-pending patent application. The entire disclosure of the referenced co-pending patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005-2011 IMVU Inc., All Rights Reserved.

BACKGROUND

1. Field

Embodiments of the invention relate to the field of computer network applications and networked communications; and more specifically, to the field of hierarchical derived digital product development via a computer network.

2. Related Art

It is well known in the commercial business environment that various levels of commercial transactions are built around the retailer/wholesaler relationship. Retailers are typically those who sell goods or commodities in small quantities directly to consumers. Wholesalers are generally those who sell goods in larger quantities, as for resale by a retailer. A variety of different relationships exist in the marketplace between retailers and wholesalers. For example, in some cases, a wholesaler may sell goods to a retailer, who may repackage the goods in a basically unmodified form and then sell the goods to consumers or end-users. In other cases, the retailer may augment or increase the value of the goods in some way and sell the higher-value goods to consumers. In still other cases, a retailer or an intermediate wholesaler may purchase component goods from a group of wholesalers, assemble the component goods into an aggregate system or some higher-value assembled product and then sell the higher-value product/system to another retailer or consumers. In each case, the cost of the component parts of an assembled system as charged by the component wholesaler must be factored in to the price charged to consumers by the retailer. Clearly, the retailer must cover the production costs of the sold goods and factor in a profit margin to sustain the business.

This commercial model has existed for many years in the domain of physical goods. The model relies upon a negotiated agreement between wholesalers and retailers at each level. The time necessary to work out these negotiated agreements is typically not a problem given that it also takes time to transport the physical goods between wholesalers and retailers. However, as the traditional model for the commercialization of physical goods moves into the commercialization of digital goods in a network environment, the efficiency of the traditional model breaks down or fails to take advantage of the speed with which digital goods can be moved around the international networked marketplace. In the commercial marketplace of digital goods of today, wholesalers and retailers of digital goods still operate in the traditional model of physical goods. That is, wholesalers, intermediate wholesalers, and retailers still collaborate off-line to create digital goods, which are then offered for sale and/or download via the network. Unfortunately, there is currently no system or Method by which wholesalers can deploy digital goods to other wholesalers or retailers directly and still generate revenue streams when their digital products are used as component parts of a higher-value digital product.

Thus, a computer-implemented hierarchical revenue model to manage revenue allocations among derived product developers in a networked system is needed.

BRIEF DESCRIPTION OF THE DRAWINGS

The present invention is illustrated by way of example and not limitation in the figures of the accompanying drawings, in which

FIGS. 2 and 3 are a block diagram of a computer system on which the present invention may operate.

FIGS. 12-16 illustrate an embodiment of a user interface shown as computer display screen snapshots.

DETAILED DESCRIPTION

A computer-implemented hierarchical revenue model to manage revenue allocations among derived product developers in a networked system is disclosed. In the following description, numerous specific details are set forth. However, it is understood that embodiments of the invention may be practiced without these specific details. In other instances, well-known processes, structures and techniques have not been shown in detail in order not to obscure the understanding of this description.

Figure 1:
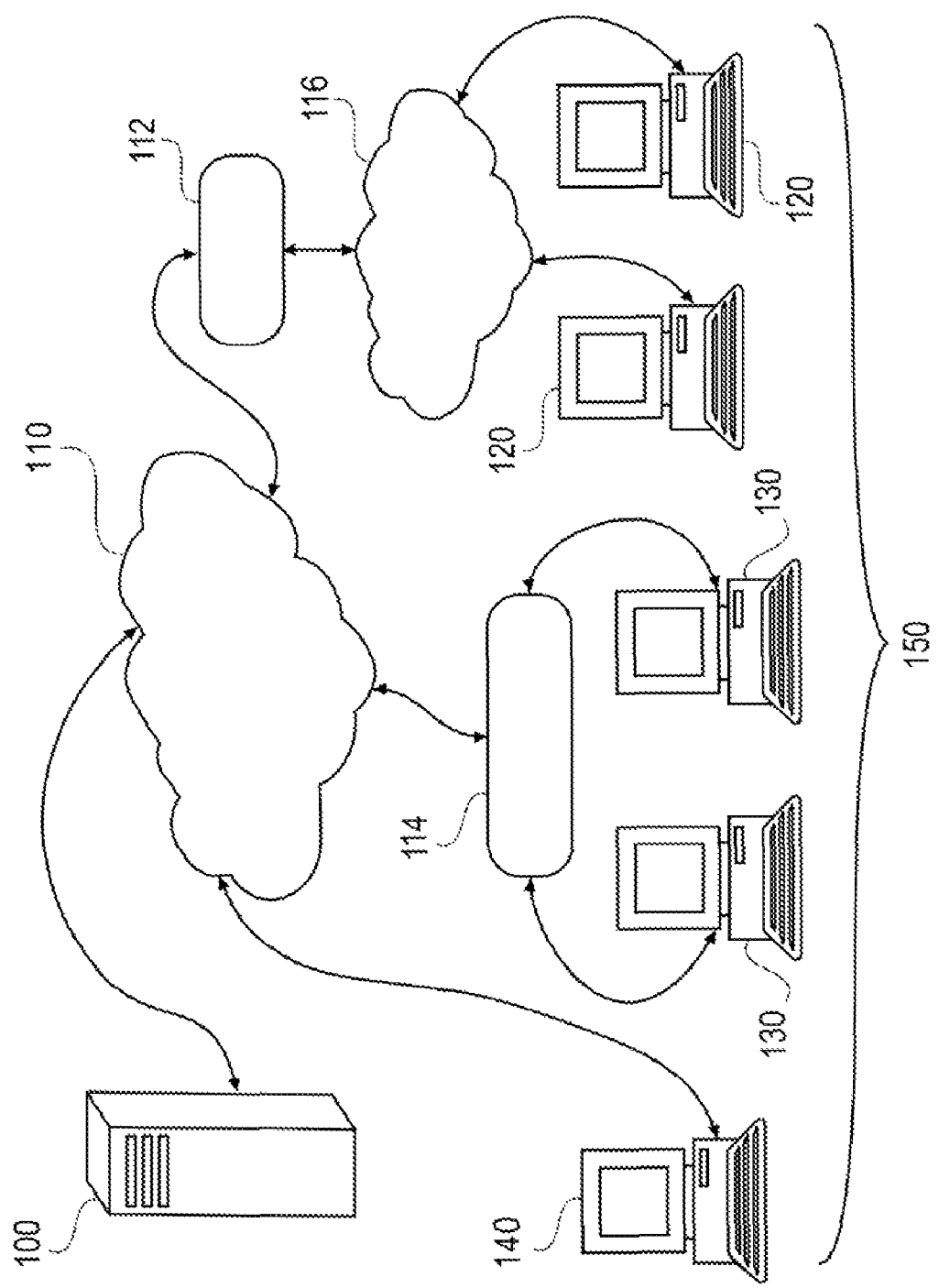
FIG. 1 is a block diagram of a network system on which the present invention may operate.

Referring now to FIG. 1, a diagram illustrates the network environment in which the present invention operates. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the Internet Explorer™ published by Microsoft Corporation of Redmond, Wash., the user interface of America On-Line™, or the web browser or HTML translator of any other well-known supplier. Using such conventional browsers and the World-Wide Web, clients 150 may access image, graphical, and textual data provided by web server 100 or they may run Web application software. Conventional means exist by which clients 150 may supply information to web server 100 through the World-Wide Web 110 and the web server 100 may return processed data to clients 150.

Having briefly described one embodiment of the network environment in which the present invention may operate, FIGS. 2 and 3 show an example of a computer system 200 illustrating an exemplary client 150 or server 100 computer system in which the features of the present invention may be implemented. Computer system 200 is comprised of a bus or other communications means 214,216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the Palm Pilot™. Client 150 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of the present invention includes software, information processing hardware, and various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

The present invention is a computer-implemented hierarchical revenue model to manage revenue allocations among derived product developers in a networked system. In one embodiment, avatars represent one example of a digital product that can be augmented, modified, improved, derived, or otherwise changed through a hierarchy of product developers, each of whom add some value to the component parts that are ultimately sold as a derived digital product.

The avatars of one embodiment of the present invention are built on conventional animated three-dimensional (3D) mathematical models using techniques well known to those of ordinary skill in the art. Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these systems do not represent the avatars as interacting in an environment.

Figure 4:
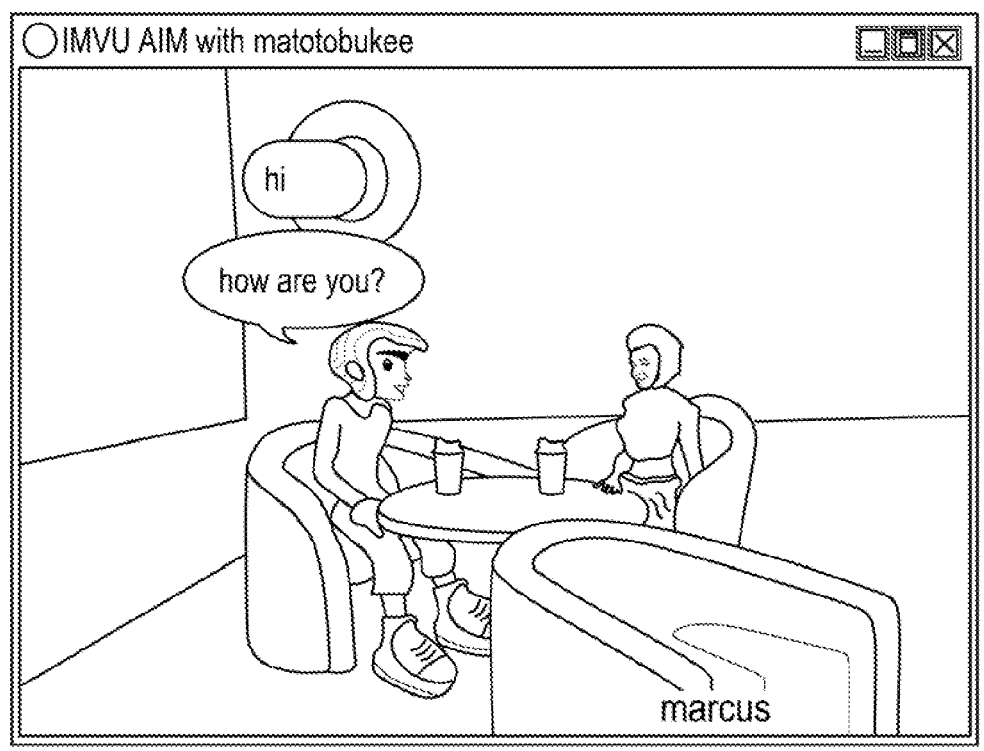
FIG. 4 illustrates an example of a shared virtual scene in which two avatars interact with each other as users represented by the avatars converse in an instant message communication environment.

The present invention improves on the prior art by placing these 3D avatars in virtual environments and enabling interaction between the avatars in a shared virtual scene. The behavior of the 3D avatars is related to the interaction between the computer users being represented by the avatars. In one embodiment, the avatars represent users in an instant messaging (IM) conversation supported by conventional network-based IM infrastructure. As the users type in dialog in a conventional IM application program, the dialog is displayed in the shared virtual scene as dialog bubbles adjacent to the avatar representing the speaker. FIG. 4 illustrates such a shared virtual scene in which two avatars are shown with associated dialog bubbles corresponding to the conversation taking place between IM users being represented by the avatars.

In the example of FIG. 4, each of the avatars in the virtual scene can represent a digital good or a digital product that can be offered for sale to a consumer. In particular, each avatar can represent a derived digital product that comprises a combination of component digital parts. For example, an avatar can include representations of various apparel and/or jewelry along with accessories. In the example of FIG. 4, one avatar is shown with a blue shirt and green shoes with a beverage cup on the table. This avatar can thus be considered a derived digital product with the blue shirt, the green shoes, and the beverage cup being digital component parts that can be purchased separately by a consumer. In this example, a consumer could be allowed to "dress" his/her avatar by purchasing component digital attire (i.e. digital component parts). The various available digital component parts can be provided by different digital wholesalers. Each wholesaler (i.e. a digital component provider), in the system of the present invention, is able to receive proportionate component revenues when purchase of a derived digital product is completed by a consumer. In the description that follows, the system and method of the present invention to enable the revenue sharing among digital component providers is fully disclosed.

Figure 5:
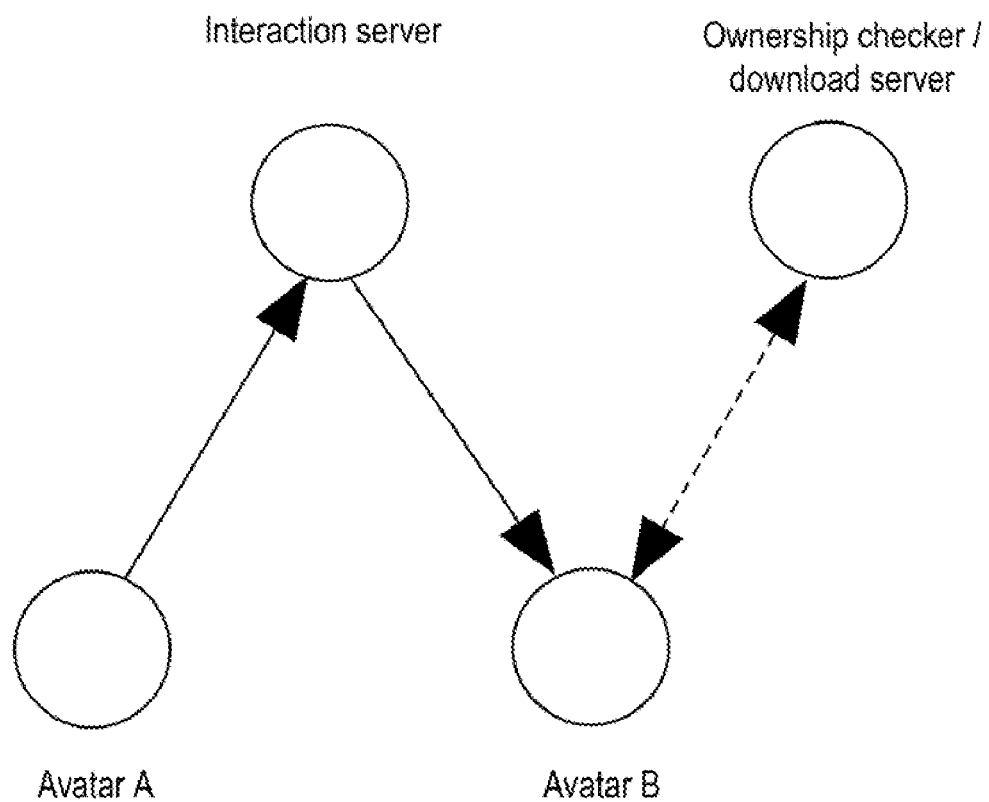
FIG. 5 illustrates a typical network architecture used in one embodiment.

Referring to FIG. 5, a diagram illustrates a typical network architecture used in one embodiment. In this embodiment, an interaction server is used to enable interaction and/or communication between two networked computer users represented by avatars (i.e. Avatar A and Avatar B). As described above, one application of die avatar embodiment of the present invention is an IM application. In the diagram of FIG. 4, the conventional IM server/provider is represented as the interaction server. In this case, the interaction server facilitates IM communications between the users associated with Avatar A and Avatar B.

Because the revenue model of the present invention relies upon the purchase and ownership of a particular avatar (i.e. digital product) by a particular user, it is necessary to determine at various stages of the IM communication whether a particular user is a legitimate owner (or licensee) of a selected avatar. For this reason, one embodiment uses the ownership checker server to validate that a specific user has acquired the rights to use a particular avatar or a particular digital product. If this ownership validation becomes necessary during an IM communication session, for example, the end user client system can initiate a communication with the ownership checker server to validate ownership of a particular digital product. If ownership is validated or a purchase transaction is completed, the ownership checker server enables the use of the particular digital product.

As an example of an ownership checking transaction, the user represented by Avatar B (shown in FIG. 5) may be in conventional IM communication with the user represented by Avatar A. During this IM session, Avatar B's user may wish to select or purchase a new pair of (digitally represented) shoes for his/her avatar (Avatar B). During this selection process, Avatar B's user is presented with various (digitally represented) shoe selections. Upon selection of a particular digital product (i.e. a digitally represented pair of shoes), the client system of Avatar B's user initiates a request to the ownership checker server to determine if Avatar B's user had previously purchased the selected digital product. If not, a purchase transaction may be initiated with the ownership checker server or another sales server in a different embodiment. Once the purchase transaction is complete, the ownership checker server validates Avatar B's user's property rights in the selected digital product and the selected (digitally represented) pair of shoes is displayed on Avatar B.

Figure 6:
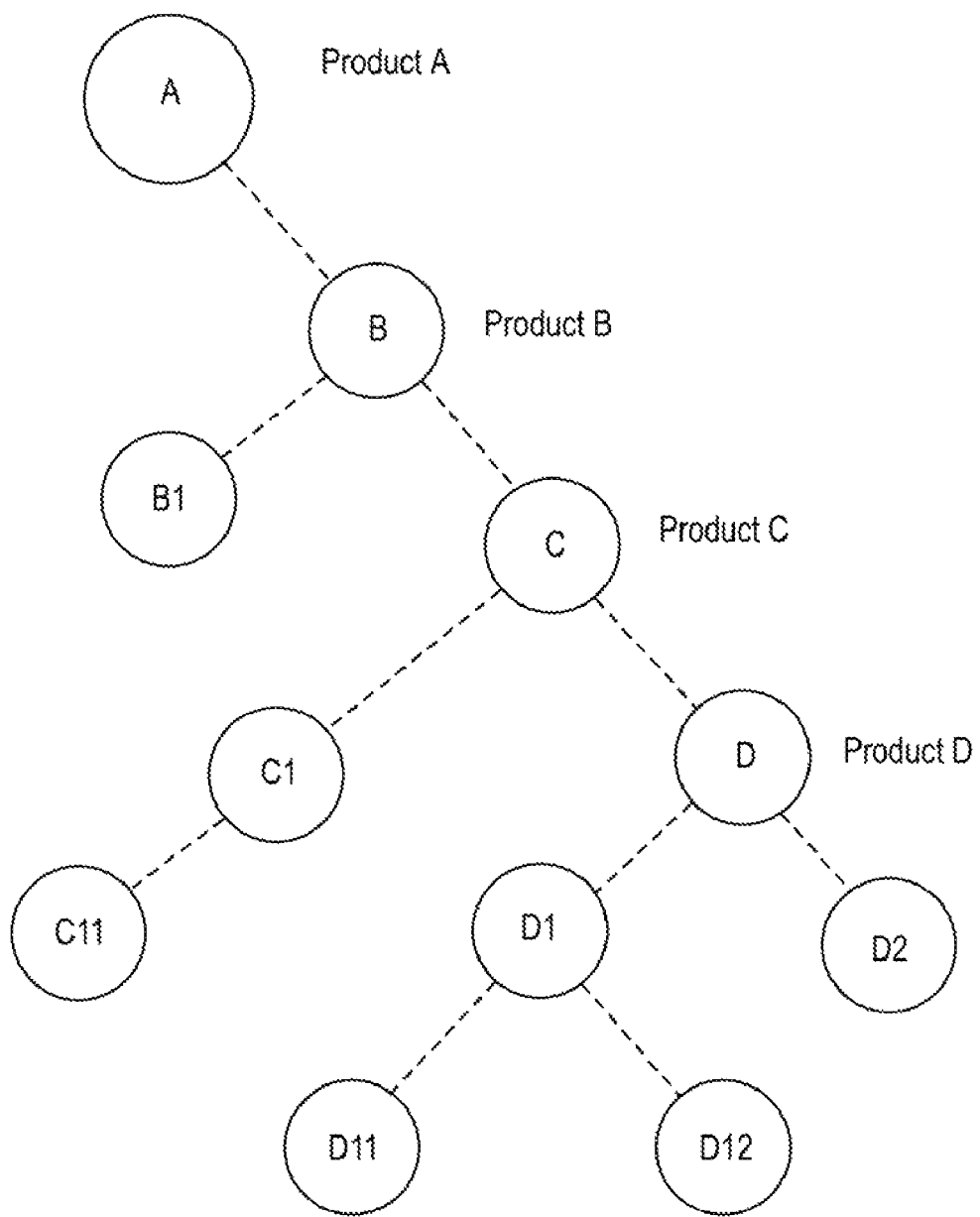
FIG. 6 illustrates a representation of a derived digital product A as made up of several digital component parts (i.e. component products B, C, and D), each of which are made up of their own component parts.

Referring to FIG. 6, a diagram illustrates a representation of a sample parentage tree showing relationships between various digital products and related derived products and components. In the example shown in FIG. 6, digital product A is the ancestor of various other derived digital products shown as products B, C, and D. In particular, product A is the parent of product B. This means that product B inherits the characteristics of product A, and product B is derived from product A. Similarly, product C inherits the characteristics of products A and B, and product C is derived from product B (and indirectly derived from product A). Additionally, other derived products may similarly be created; such as, product B1 can be derived from Product B and inherit the characteristics of product B (and indirectly inherit from product A). As shown in FIG. 6, other derived products, such as products C11, C1, D, D11, D1, D12, and D2 may be arbitrarily created in various relationships to each other. In each case, every derived product has at least one parent product/component. It is also possible for a given derived product to have multiple parents. In this case, the derived product inherits the characteristics of each of the parent components.

As will be described in more detail below, wholesale and retail costs (revenue) associated with each component are allocated and aggregated to determine the wholesale and retail costs (revenue) associated with a derived digital product/component. As such, the values or various costs associated with each derived component are included in the characteristics inherited by the derived component from its parent components. Using the techniques of the present invention disclosed herein, various developers of digital goods can choose to build new derived digital goods from an existing parent digital component. The value existing in the parent component is inherited by the new derived good and the developer can assign an additional value to the derived digital good that typically represents the additional value the developer has added to the derived digital good. In this manner, the developer can arbitrarily insert a new derived component into the parentage tree represented by example in FIG. 6 by choosing a parent component from which the derived component will be derived. This process will be described in further detail in connection with the figures herein illustrating various user interface screen snapshots of an embodiment of the invention.

Figure 7:
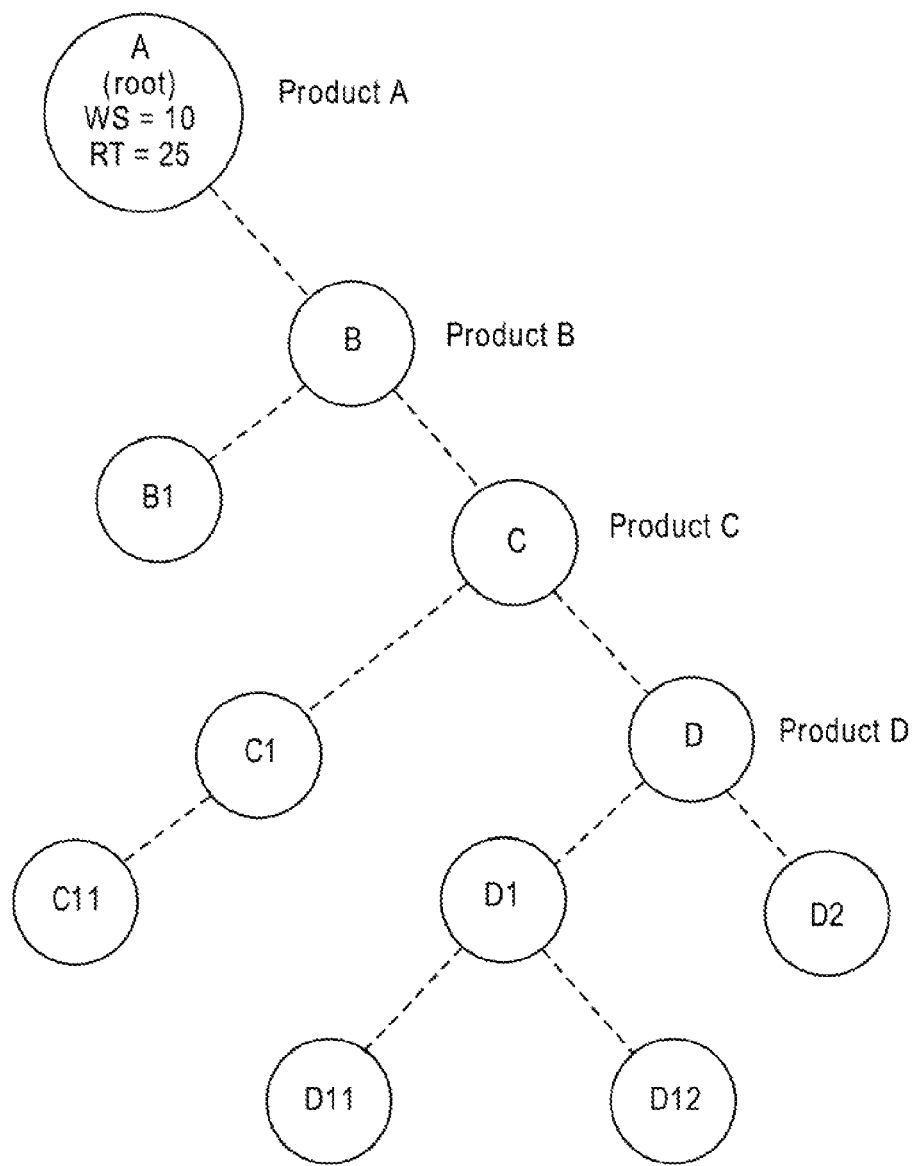
FIG. 7 illustrates the same representation shown in FIG. 6, except the characteristics of product A have been highlighted.

Referring to FIG. 7, the same sample parentage tree shown in FIG. 6 has been modified to illustrate the characteristic details of component A. As shown, the characteristics of component A include the identity of the component (A), the identity of the component's next level parent (in this case, A has no parent as it is the root node of the tree), the wholesale value (WS) of the component, and the retail value (RT) of the component. In the example shown in FIGS. 7-11, specific values are shown as examples for the RT and WS characteristics for particular components. It will be understood by those of ordinary skill in the art that these characteristics are variables and may be assigned any value. Similarly, it will be understood by those of ordinary skill in the art that many other component characteristics are or could be associated with a particular component. Once the root component is established, other derived components may be created from the root component or other derived components by independent developers in the manner described in more detail below.

Figure 8:
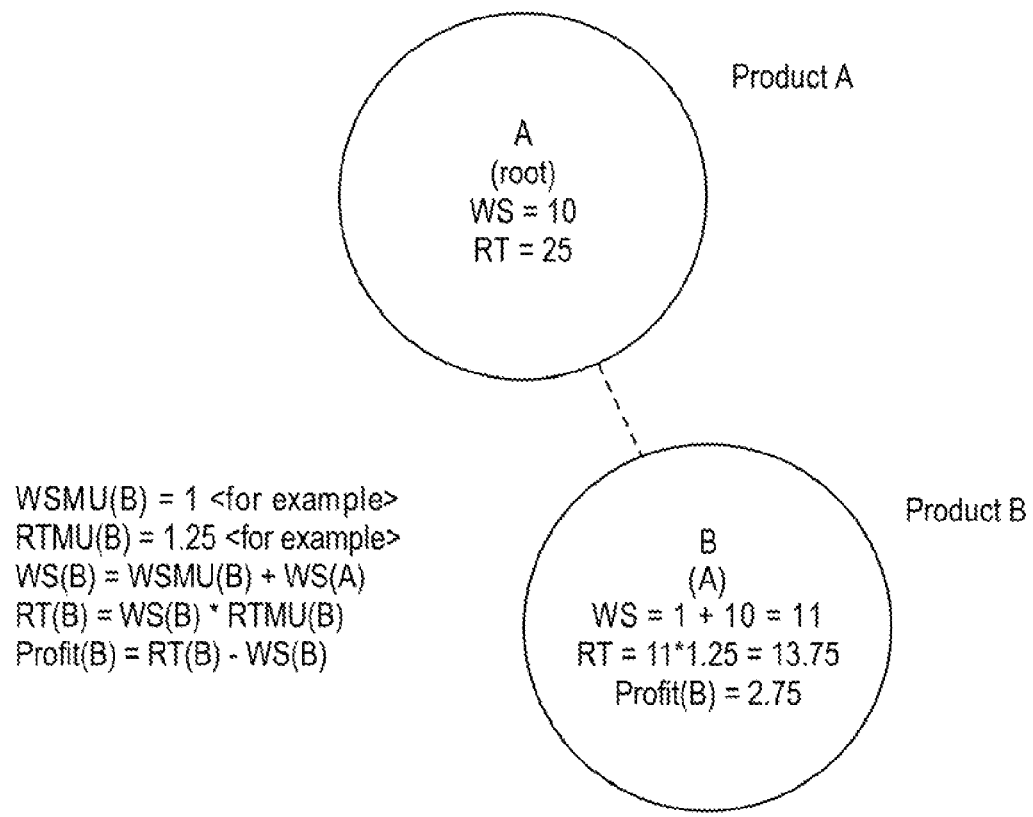
FIG. 8 illustrates the characteristics of products A and B and the computation of wholesale and retail values.

Referring to FIG. 8, a portion of the same sample parentage tree shown in FIG. 7 has been modified to illustrate the characteristic details of a new derived component B. Similar to component A, the characteristics of component B include the identity of the component (B), the identity of the component's next level parent (in this case, component B's parent is component A), the wholesale value (WS) of the component, and the retail value (RT) of the component. In a derived component of the present invention, the WS and RT values of the derived component can be computed in the manner described below.

In the example of FIG. 8, the values for WS and WIT of component A are generated as described above. In this example, the WS of component A is 10 [i.e. WS(A)=10] and the RT of component A is 25 (i.e. RT(A)=25). Because component A is the parent of component B, WS(A) will be used in the computation of the WS of component B [WS(B)] as described below. Conceptually, the developer of component B has chosen to use component A as a building block or foundation upon which derived component B will be built. As such, all or a substantial part of component A will necessarily be included as part of the completed derived component B. The value of WS(A) roughly represents the cost to produce the component A. Thus, because derived component B will include component A, the value of WS(B) will include the cost to produce component A combined with the additional cost of producing the derived portion of component B. As shown in FIG. 8, the additional cost of producing the derived portion of component B is reflected as a wholesale mark up value (WSMU). In the example of FIG. 8, the WSMU value for component B [WSMU(B)] is arbitrarily given the value of 1. Clearly this variable could be any value roughly representing the additional cost of producing the derived portion of component B. Thus, the value of WS(B) including the cost to produce component A combined with the additional cost of producing the derived portion of component B is given by the formula:

$$WS(B)=WSMU(B)+WS(A)$$

In an alternative embodiment, the WSMU(B) can be defined as a multiplier, which would be used in an alternate formula as follows:

$$WS(B)=WSMU(B)*WS(A)$$

In either case, the result is the computed wholesale value of component B [WS(B)]. In the example of FIG. 8, this sample value equals 11 as shown.

The retail value of component B [RT(B)] represents the value a consumer/purchaser will pay for the component. The RT of a component is clearly set at a value greater than the WS value to enable the developer to profit from the transaction. In one embodiment of the invention, the derived component developer is allowed to set the RT at any arbitrary value that s/he believes a purchaser will be willing to pay. In the embodiment shown in FIG. 8, the RT(B) is shown as a product of the WS(B) multiplied with a retail markup value (RTMU) typically defined by the derived component developer. The RTMU corresponds to the profit margin the developer expects to make. Thus, in the embodiment shown in FIG. 8, the RT(B) is computed as follows:

$$RT(B)=WS(B)*RTMU(B)$$

The result is the computed retail value of component 13 [RT(B)]. In the example of FIG. 8, this sample value equals 13.75 as shown.

In an alternative embodiment, the RTMU can be defined as a fixed profit value added to the WS value of the component. This embodiment is computed as follows:

$$RT(B)=WS(B)+RTMU(B)$$

The profit realized by the derived component developer is the difference between the wholesale value of the component and the retail value of the component. Thus, in the example of FIG. 8, the profit for the developer of derived component B is given as follows:

$$\mathrm{Profit}(B)=RT(B)-WS(B)$$

As shown in FIG. 8, the present invention enables a derived component to be created and to have wholesale and retail values associated with the derived component that factor in the wholesale value associated with the parent of the derived component. In this manner, a computer-implemented hierarchical revenue model can be created to manage revenue allocations among derived product developers in a networked system.

Figure 9:
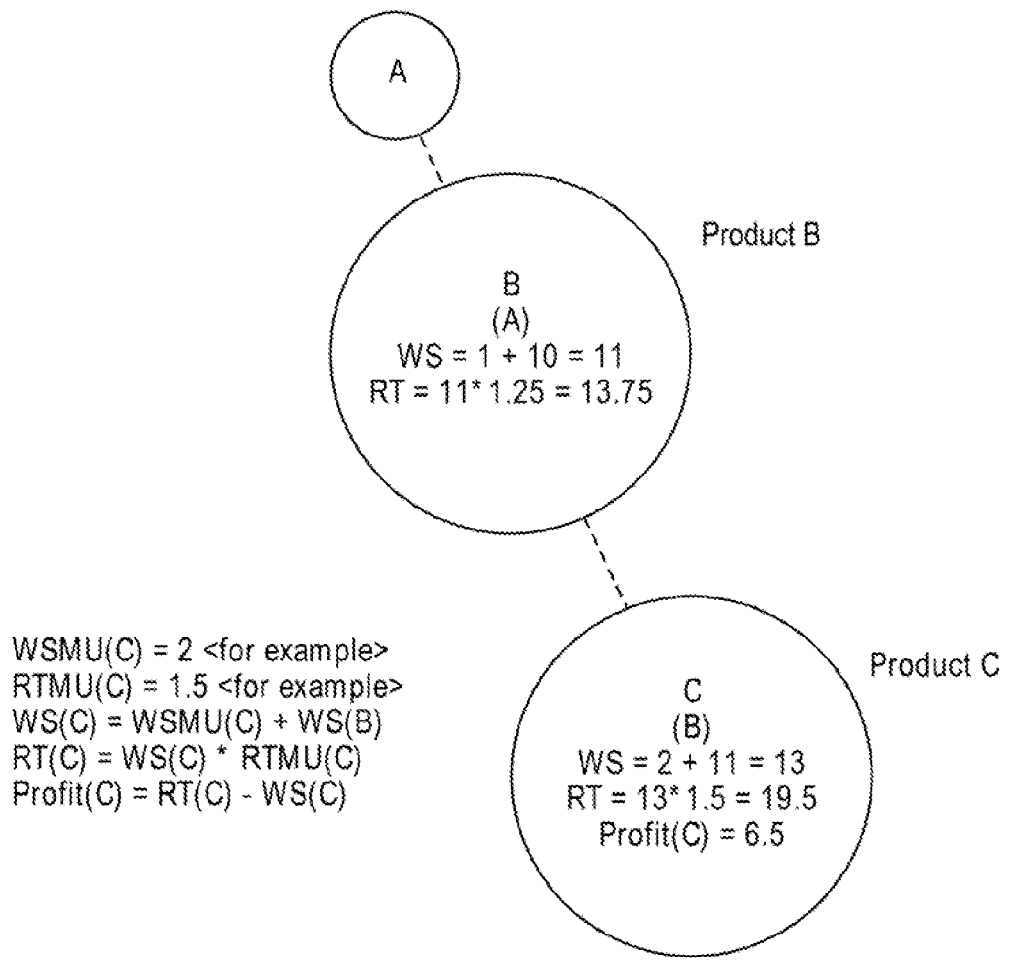
FIG. 9 illustrates the characteristics of products B and C and the computation of wholesale and retail values.

In FIG. 9, an additional portion of the same sample parentage tree shown in FIGS. 7 and 8 has been modified to illustrate the characteristic details of a new derived component C. Derived component C is shown as connected to its parent component B, which in turn is connected to its parent component A. Similar to components A and B, the characteristics of component C include the identity of the component (C), the identity of the component's next level parent (in this case, component C's parent is component B), the wholesale value (WS) of the component, and the retail value (RT) of the component. In a derived component of the present invention, the WS and RT values of the derived component can be computed in the manner described below.

In the example of FIG. 9, the values for WS and RT of components A and B are generated as described above. In this example, the WS of component B is 11 [i.e. WS(B)=11] and the RT of component B is 13.75 (i.e. RT(B)=13.75). Because component B is the parent of component C, WS(B) will be used in the computation of the WS of component C [WS(C)] as described below. Because derived component C will include components A and B, the value of WS(C) will include the cost to produce both components A and B combined with the additional cost of producing the derived portion of component C. As shown in FIG. 9, the additional cost of producing the derived portion of component C is reflected as a wholesale mark up value (WSMU). In the example of FIG. 9, the WSMU value for component C [WSMU(C)] is arbitrarily given the value of 2. Clearly this variable could be any value roughly representing the additional cost of producing the derived portion of component C. Thus, the value of WS(C) including the cost to produce both components A and B combined with the additional cost of producing the derived portion of component C is given by the formula:

$$WS(C)=WSMU(C)+WS(B)$$

Note that the cost of producing component A is already factored into the wholesale value of component B [WS(B)].

Thus, the wholesale value of component C inherently includes the wholesale value of components A and B, i.e. each of its ancestors. In an alternative embodiment, the WSMU(C) can be defined as a multiplier, which would be used in an alternate formula as follows:

$$WS(C)=WSMU(C)*WS(B)$$

In either case, the result is the computed wholesale value of component C [WS(C)]. In the example of FIG. 9, this sample value equals 13 as shown.

The retail value of component C [RT(C)] represents the value a consumer/purchaser will pay for the component. In the embodiment shown in FIG. 9, the RT(C) is shown as a product of the WS(C) multiplied with a retail markup value (RTMU) typically defined by the derived component developer. The RTMU corresponds to the profit margin the developer expects to make from consumer/purchasers. Thus, in the embodiment shown in FIG. 9, the RT(C) is computed as follows:

$$RT(C)=WS(C)*RTMU(C)$$

The result is the computed retail value of component C [RT(C)]. In the example of FIG. 9, this sample value equals 19.5 as shown.

In an alternative embodiment, the RTMU can be defined as a fixed profit value added to the WS value of the component. This embodiment is computed as follows:

$$RT(C)=WS(C)+RTMU(C)$$

The profit realized by the derived component developer is the difference between the wholesale value of the component and the retail value of the component. Thus, in the example of FIG. 9, the profit for the developer of derived component C is given as follows:

$$Profit(C)=RT(C)-WS(C)$$

As shown in FIGS. 8 and 9, the present invention enables a derived component to be created at any level in a hierarchy and to have wholesale and retail values associated with the derived component that factor in the wholesale values associated with the ancestors of the derived component. In this manner, a computer-implemented hierarchical revenue model can be created to manage revenue allocations among derived product developers in a networked system.

Figure 10:
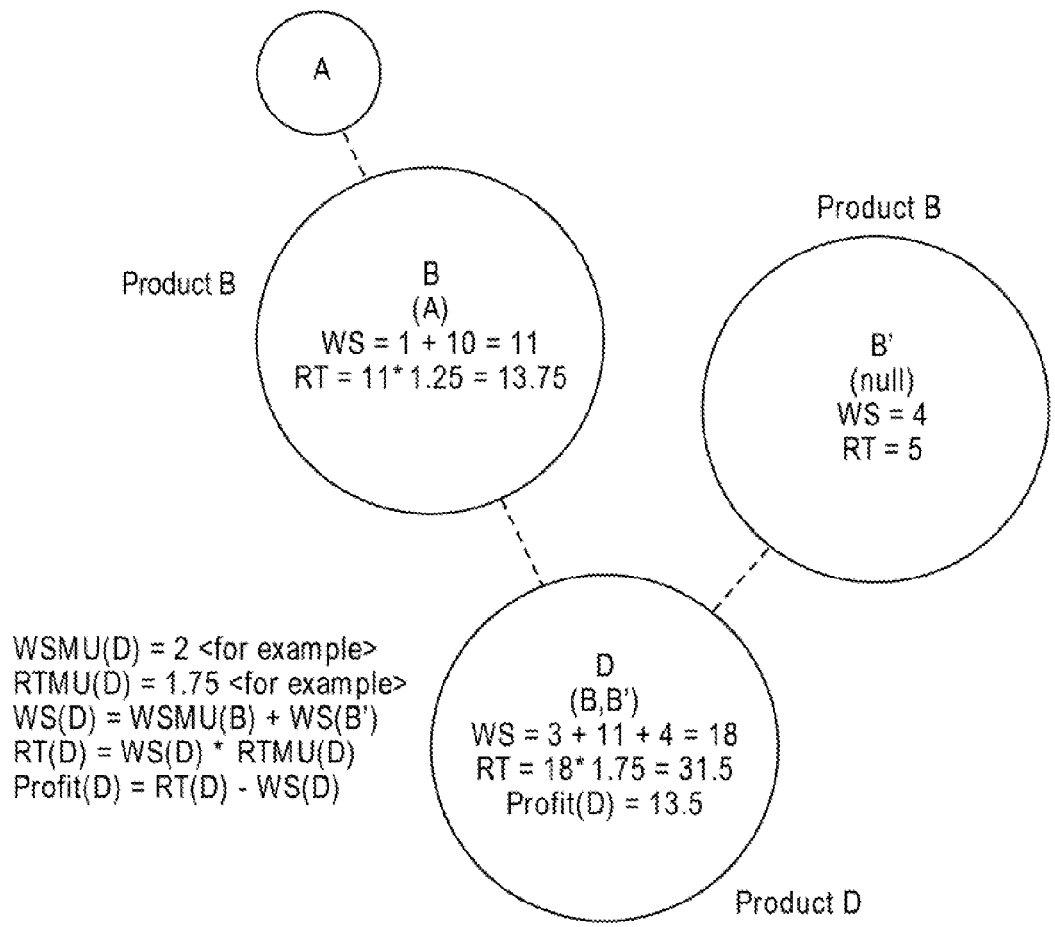
FIG. 10 illustrates a product derived from multiple parent products.

FIG. 10 illustrates an embodiment in which a derived component D is derived from two parent components, i.e. derived component B and component B'. In FIG. 10, derived component D is shown as connected to parent component B, which in turn is connected to its parent component A. Derived component D is also connected to parent component B'. Similar to components A, B, and B', the characteristics of component D include the identity of the component (D), the identity of the component's next level parents (in this case, component D's parents are component B and B'), the wholesale value (WS) of the component, and the retail value (RT) of the component. In a derived component of the present invention, the WS and RT values of the derived component can be computed in the manner described below.

In the example of FIG. 10, the values for WS and RT of components A, B, and B' are generated in the manner as described above. In this example, the WS of component B is 11 [i.e. WS(B)=11] and the RT of component B is 13.75 (i.e. RT(B)=13.75). Similarly, the WS of component B' is 4 [i.e. WS(B')=4] and the RT of component B' is 5 (i.e. RT(B')=5). Because components B and B' are the parents of component D, WS(B) and WS(B') will be used in the computation of the WS of component D [WS(D)] as described below. Because derived component D will include components A, B, and B', the value of WS(D) will include the cost to produce components A, B, and B' combined with the additional cost of producing the derived portion of component D. As shown in FIG. 10, the additional cost of producing the derived portion of component D is reflected as a wholesale mark up value (WSMU). In the example of FIG. 10, the WSMU value for component D [WSMU(D)] is arbitrarily given the value of 3. Clearly this variable could be any value roughly representing the additional cost of producing the derived portion of component D. Thus, the value of WS(D) including the cost to produce components A, B, and B' combined with the additional cost of producing the derived portion of component D is given by the formula:

$$WS(D)=WSMU(D)+WS(B)+WS(B')$$

Note that the cost of producing component A is already factored into the wholesale value of component B [WS(B)]. Thus, the wholesale value of component D inherently includes the wholesale value of components A, B, and B', i.e. each of its ancestors. In an alternative embodiment, the WSMU(D) can be defined as a multiplier, which would be used in an alternate formula as follows:

$$WS(D)=WSMU(D)*(WS(B)+WS(B'))$$

In either case, the result is the computed wholesale value of component D [WS(D)]. In the example of FIG. 10, this sample value equals 18 as shown.

The retail value of component D [RT(D)] represents the value a consumer/purchaser will pay for the component. In the embodiment shown in FIG. 10, the RT(D) is shown as a product of the WS(D) multiplied with a retail markup value (RTMU) typically defined by the derived component developer. The RTMU corresponds to the profit margin the developer expects to make. Thus, in the embodiment shown in FIG. 10, the RT(D) is computed as follows:

$$RT(D)=WS(D)*RTMU(D)$$

The result is the computed retail value of component D [RT(D)]. In the example of FIG. 10, this sample value equals 31.5 as shown.

In an alternative embodiment, the RTMU can be defined as a fixed profit value added to the WS value of the component. This embodiment is computed as follows:

$$RT(D)=WS(D)+RTMU(D)$$

The profit realized by the derived component developer is the difference between the wholesale value of the component and the retail value of the component. Thus, in the example of FIG. 10, the profit for the developer of derived component D is given as follows:

$$Profit(D)=RT(D)-WS(D)$$

As shown in FIGS. 8-10, the present invention enables a derived component to be created at any level in a hierarchy, with any number of parent components, and to have wholesale and retail values associated with the derived component that factor in the wholesale values associated with the ancestors of the derived component. In this manner, a computer-implemented hierarchical revenue model can be created to manage revenue allocations among derived product developers in a networked system.

Once the computer-implemented hierarchical revenue model of the present invention is created as described above, the model and the products/components represented therein, can be made available for purchase or lease to consumer/purchasers via the network infrastructure also described above. Using a computer-implemented user interface, a consumer can identify for purchase one of the products available in a particular implementation of the present invention.

Figure 11:
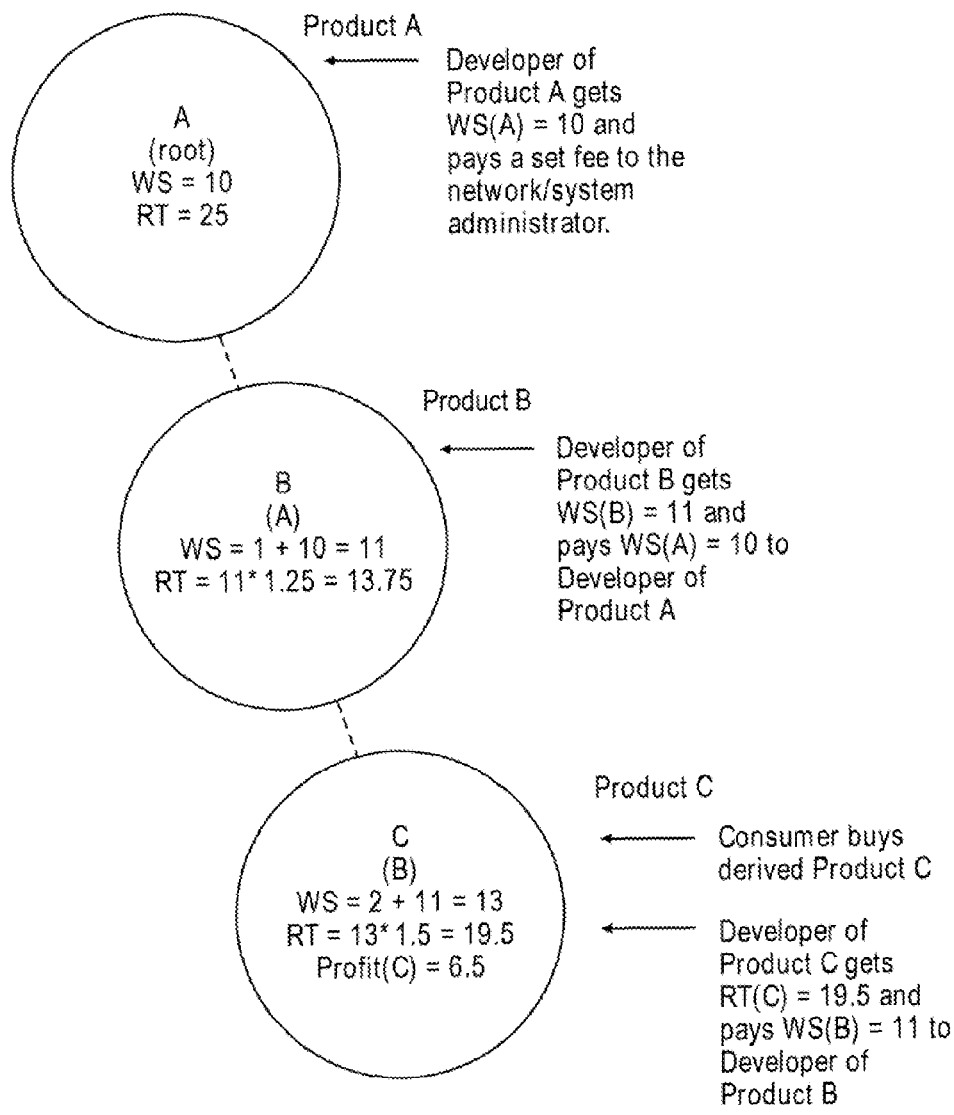
FIG. 11 illustrates the allocation of revenue among product developers.

Referring to FIG. 11, the sample computer-implemented hierarchical revenue model of the present invention created as described above in relation to FIGS. 8-9 is shown. Using a computer-implemented user interface, a consumer selects for purchase one of the products (i.e. A, B, or C) available in the particular sample implementation of the described embodiment. As shown in FIG. 11, if the consumer selects for purchase product C, the consumer pays the retail price for product C (i.e. RT(C)=19.5). This purchase can be performed on a standard public network, such as the Internet, using conventional techniques. The developer of product C receives the retail price for product C (i.e. RT(C)=19.5), but the developer of product C must pay the wholesale price for component B from which product C was derived, Thus, the developer of product C pays the wholesale price for component B (i.e. WS(B)=11) to the developer of product B, the parent of product C. The developer of product 13 receives the wholesale price for component B (i.e. WS(B)=11) from developer C; however, developer B must pay the wholesale price for component A (i.e. WS(A)=10) to the developer of product A, the parent of product B. The developer of product A receives the wholesale price for component A (i.e. WS(AB)=10) from developer B. Because product A is the root node and has no ancestors, it would be beneficial for the developer of product A to pay a set amount to the network/system administrator to support the costs necessary to provide the network and administrative infrastructure needed to keep the system running.

Thus, as can be seen by the example illustrated in FIG. 11, the purchase of a product by a consumer causes the corresponding revenue to be appropriately allocated and automatically paid to the developer/owners of the ancestor components corresponding to the purchased product. In this manner, a computer-implemented hierarchical revenue model can be created to manage revenue allocations among derived product developers in a networked system.

Figure 12:
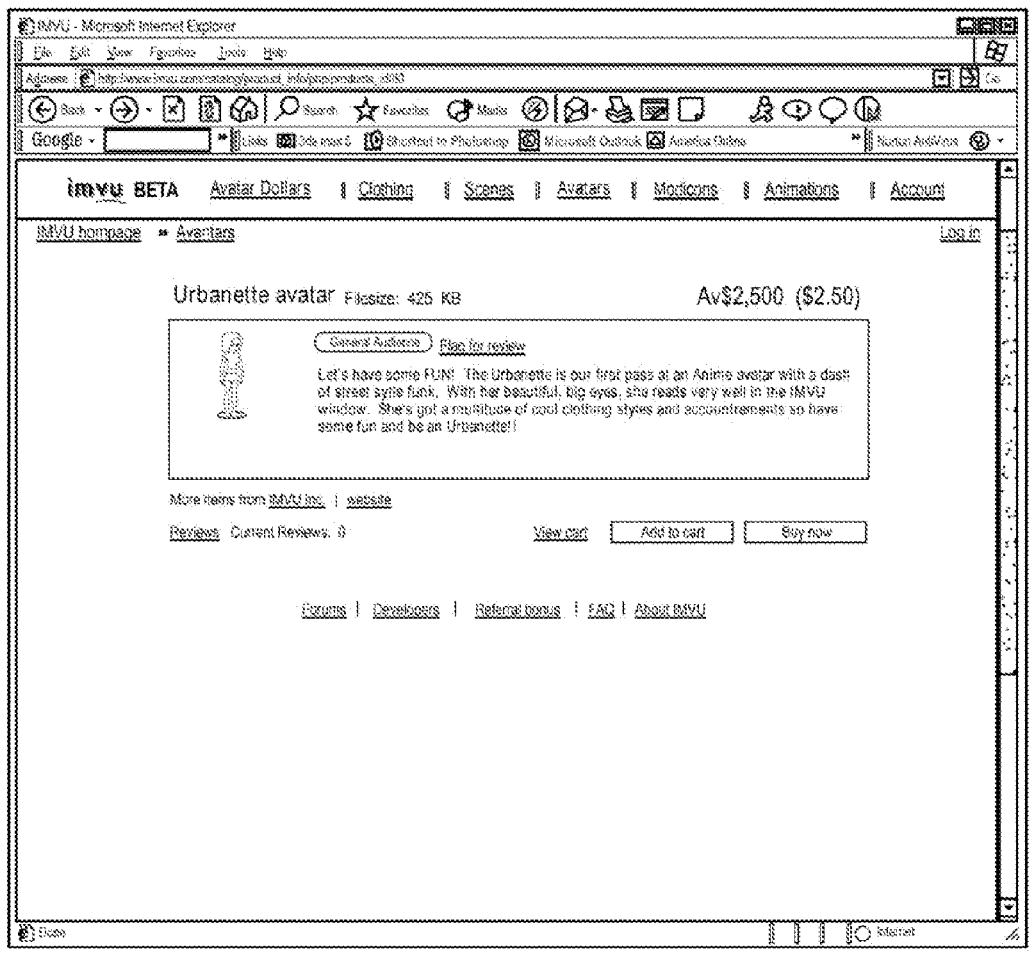

As an example of the present invention and a user interface associated therewith, FIGS. 12-16 illustrate an embodiment of a user interface shown as computer display screen snapshots. In FIG. 12 (Urbanette avatar), a digital product is shown as available for purchase. In this example, the digital product is an avatar figure. Note the retail cost of the avatar figure is shown as AV$2,500. In this example, this product might represent the root node of a hierarchy of products in a particular revenue model.

Figure 13:
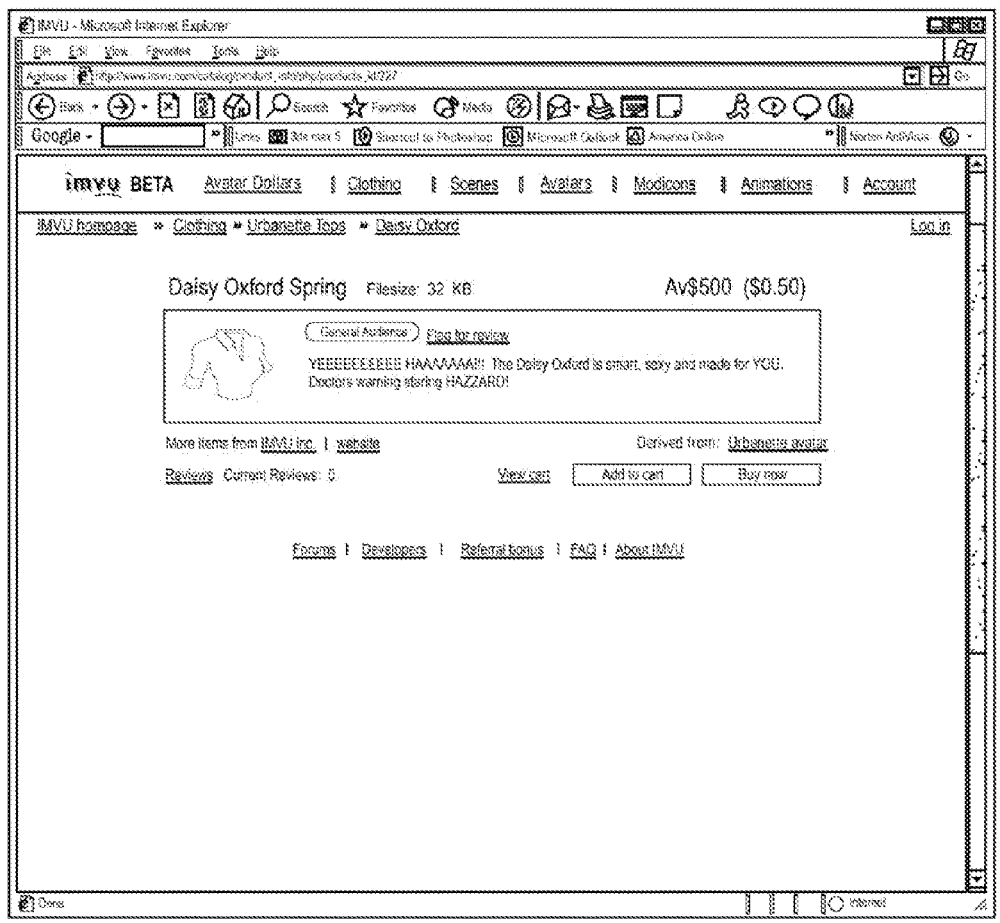

As shown in FIG. 13, another digital product (Daisy Oxford Spring) is shown as a product for sale for a retail price of AV$500. Note that at the middle right portion of the figure, a comment states that this product (Daisy Oxford Spring) is derived from the Urbanette avatar product shown in FIG. 12. Thus, the product shown in FIG. 13 is derived from its parent product shown in FIG. 12 in a similar manner that Product B is derived from Product A as shown in FIG. 8.

Figure 14:
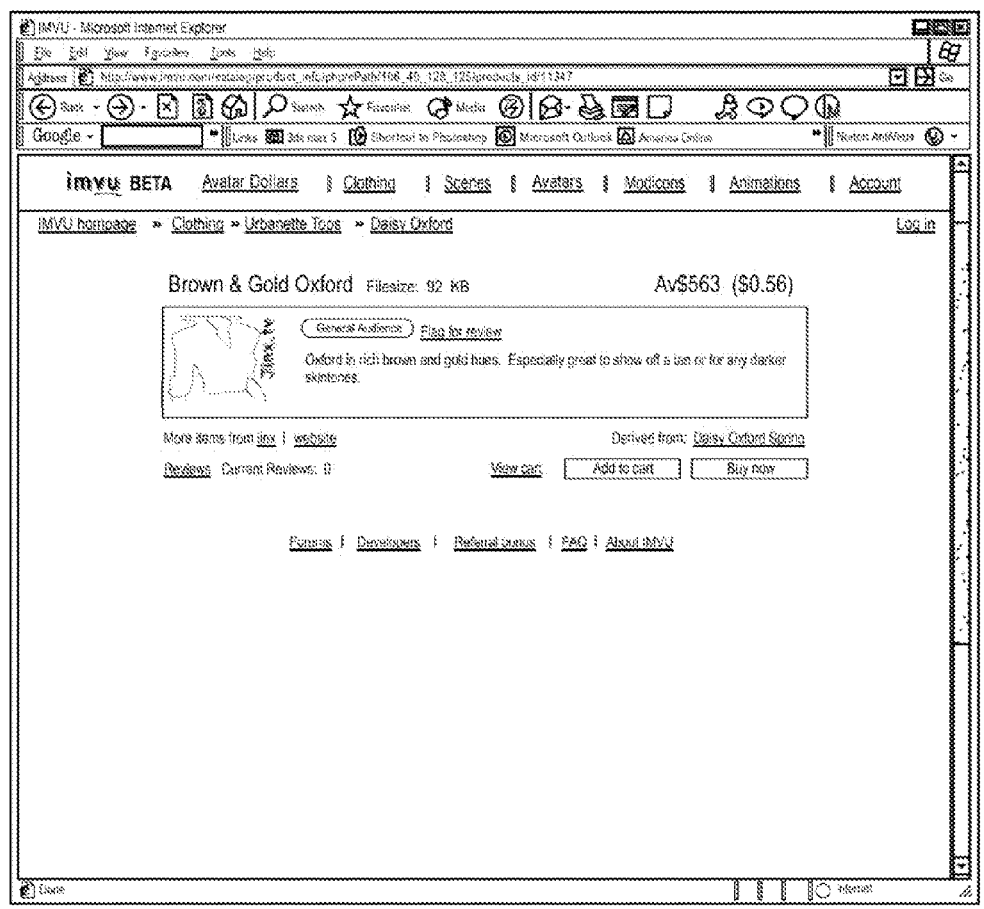

As shown in FIG. 14, another digital product (Brown & Gold Oxford) is shown as a product for sale for a retail price of AV$563. Note that at the middle right portion of the figure, a comment states that this product (Brown & Gold Oxford) is derived from the Daisy Oxford Spring product shown in FIG. 13. Thus, the product shown in FIG. 14 is derived from its parent product shown in FIG. 13, which is derived from its parent product shown in FIG. 12 in a similar manner that Product C is derived from Product B, which is derived from Product A as shown in FIG. 9.

Figure 15:
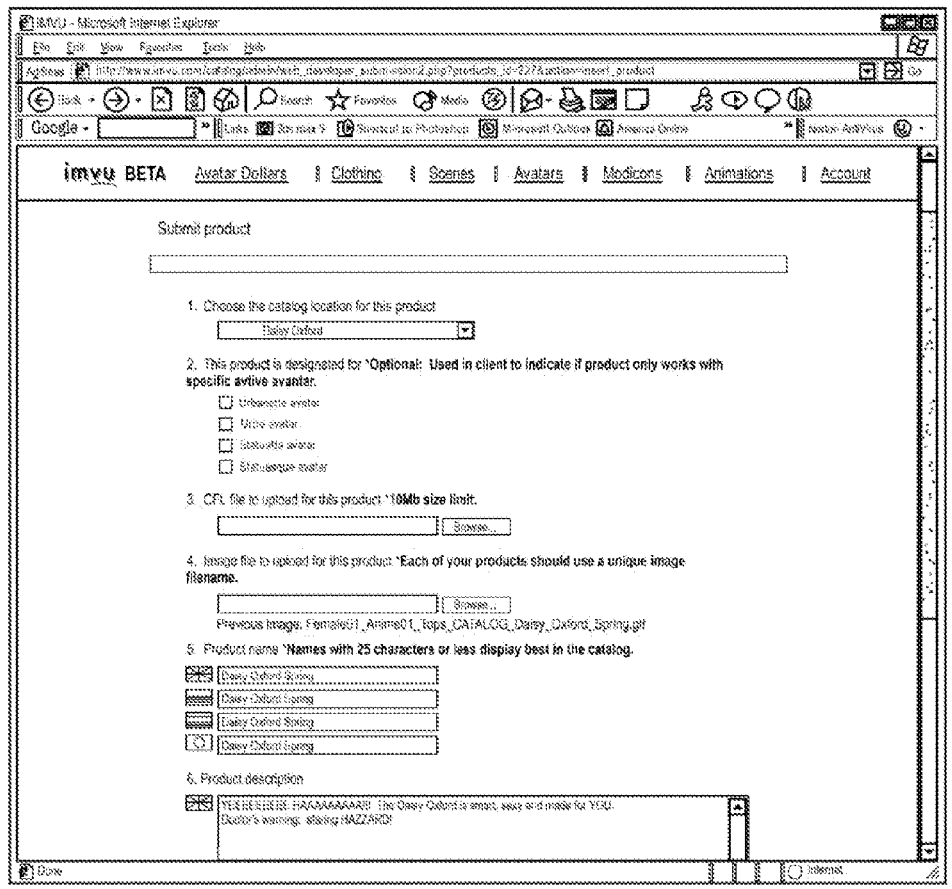
Figure 16:
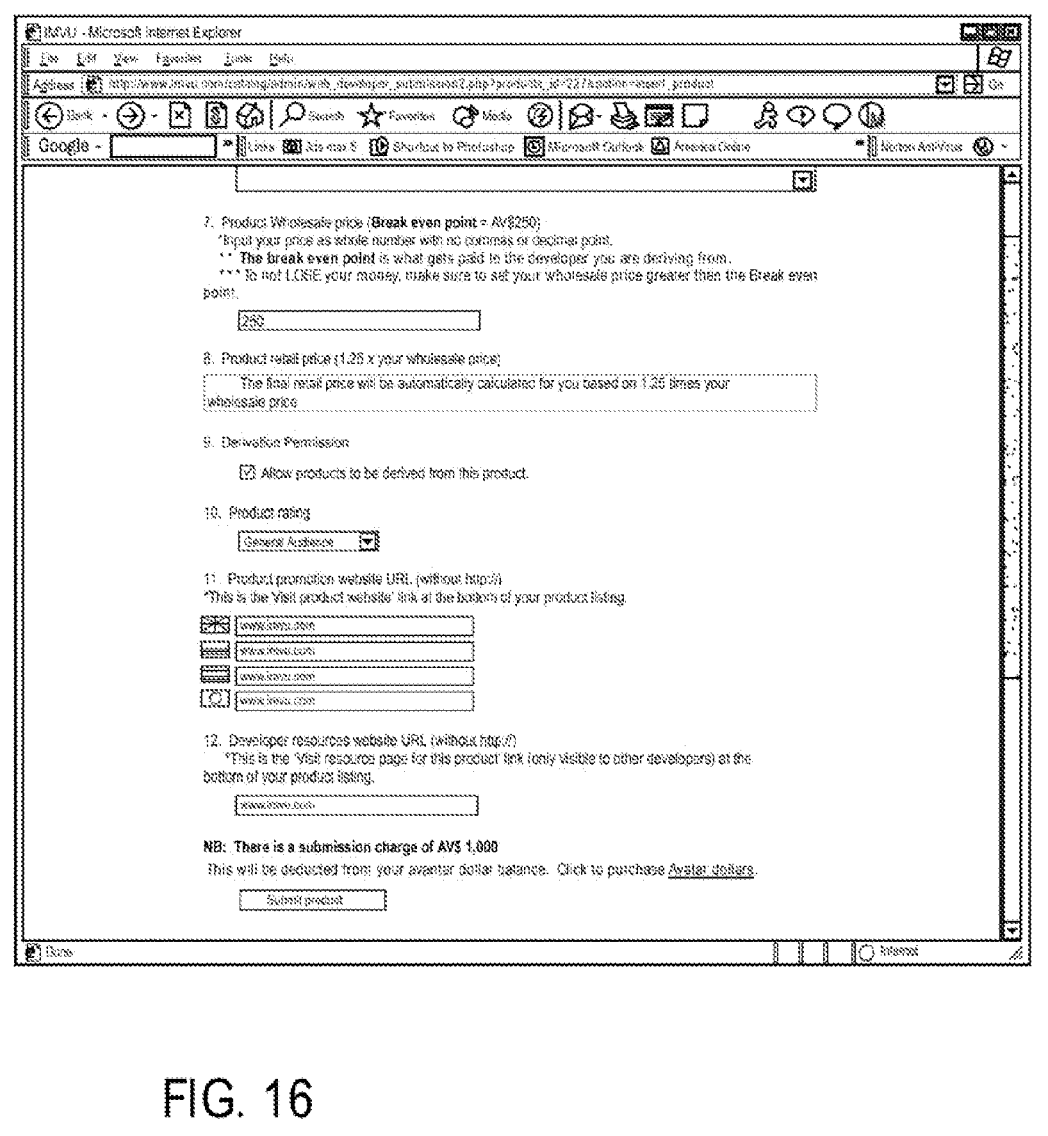

Referring to FIGS. 15-16, user interface screen snapshots represent an embodiment of a presentation to a product developer who is being prompted to submit a product for addition to the hierarchical revenue model. Note that at item 1 on FIG. 15, the developer specifies the identity of the parent product (e.g. Daisy Oxford) from which the developer's new product will be derived. This specification of the identity of the parent product enables the system of the present invention to properly place the newly created product into the hierarchical structure and to properly initialize the necessary links between products. Note that at item 5 of FIG. 15, the developer can provide the identity of the new product.

Referring to FIG. 16, the developer can specify the wholesale price for the new product at item 7. Because the developer has already identified the parent of the new product, the system can insert a default break even point corresponding to the wholesale value of the parent product. However, the system enables the developer to override this default value and insert a desired wholesale value for the new product. In the case, the developer has entered 250. Once the developer has entered the desired wholesale value for the new product, the system can compute the corresponding retail value as shown at item 8 in FIG. 16. In this case, the retail value is computed as 1.25 times the previously specified wholesale price. However, the retail price can be computed in any number of ways. Alternatively, the system could prompt the developer for the entry of a desired retail value. These values and other data gathered through the user interface or generated in response thereto can be assembled into a set of characteristics associated with the new digital component and inserted into the data structure described in detail above.

Thus, a computer-implemented hierarchical revenue model to manage revenue allocations among derived product developers in a networked system is disclosed. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

We claim:

1. A computer-implemented method, comprising:
   providing a processor;
   storing, in a data storage device in data communication with the processor, a plurality of digital components, each digital component of the plurality of digital components having associated characteristics and being configured for modeling in a three dimensional (3D) virtual environment, the plurality of digital components including derived digital components that inherit characteristics from ancestor digital components, at least one of the inherited characteristics being revenue values corresponding to each ancestor digital component;
   allocating a first revenue value associated with a first digital component, the first digital component being related to a first party;
   allocating a second revenue value associated with a second digital component, the second digital component being related to a second party, the second party being different from the first party;
   receiving user input data via a user interface;
   modifying, by use of the processor and the user input data, the first digital component to include at least a portion of the second digital component, thereby producing a third digital component, the first, second, and third digital components being configured for modeling in the 3D virtual environment, the second digital component being configured for integration and operation with the first digital component for modeling in the 3D virtual environment, the third digital component being a derived digital component that inherits characteristics of the first and the second digital components, the third digital component inheriting the first revenue value from the first digital component, the third digital component inheriting the second revenue value from the second digital component;

combining the inherited first revenue value with the inherited second revenue value to produce a third revenue value associated with the third digital component;

offering the third digital component to consumers at a price corresponding to the third revenue value;

allocating a first portion of the third revenue value to the first party, the value of the first portion corresponding to the inherited first revenue value; and allocating a second portion of the third revenue value to the second party, the value of the second portion corresponding to the inherited second revenue value.

2. The method as claimed in claim 1 wherein the second digital component is derived from the first digital component.

3. The method as claimed in claim 1 wherein the first digital component is a parent of the second digital component.

4. The method as claimed in claim 1 wherein the first revenue value is reduced by a pre-determined percentage.

5. The method as claimed in claim 1 wherein the second revenue value is reduced by a pre-determined percentage.

6. The method as claimed in claim 1 wherein the third revenue value is reduced by a pre-determined percentage.

7. The method as claimed in claim 1 further including:
providing a fourth revenue value associated with the third digital component, the fourth revenue value being a retail price associated with the third digital component, the retail price being the third revenue value multiplied by a profit multiplier.

8. The method as claimed in claim 1 further including:
providing a fourth revenue value associated with the third digital component, the fourth revenue value being a retail price, wherein the fourth revenue value is computed based on the third revenue value.

9. The method as claimed in claim 1 wherein an identity of a parent of the second digital component is specified via a user interface.

10. The method as claimed in claim 1 wherein the second digital component has a plurality of parents.

11. A computer-implemented apparatus comprising:
a processor;
a data storage device in data communication with the processor, the data storage device for storing a plurality of digital components, each digital component of the plurality of digital components having associated characteristics and being configured for modeling in a three dimensional (3D) virtual environment, the plurality of digital components comprising digital components, the digital components including derived digital components that inherit characteristics from ancestor digital components, at least one of the inherited characteristics being revenue values corresponding to each ancestor digital component;
a first processing module, executable by the processor, to allocate a first revenue value associated with a first digital component, the first digital component being related to a first party;
a second processing module, executable by the processor, to allocate a second revenue value associated with a second digital component, the second digital component being related to a second party, the second party being different from the first party;
a user interface for receiving user input; and
a third processing module, executable by the processor, to provide the user interface to modify, by use of the processor and the user input, the first digital component to include at least a portion of the second digital component, thereby producing a third digital component, the first, second, and third digital components being configured for modeling in the 3D virtual environment, the second digital component being configured for integration and operation with the first digital component for modeling in the 3D virtual environment, the third digital component being a derived digital component that inherits characteristics of the first and the second digital components, the third digital component inheriting the first revenue value from the first digital component, the third digital component inheriting the second revenue value from the second digital component;
the third processing module further to combine the inherited first revenue value with the inherited second revenue value to produce a third revenue value associated with the third digital component, to offer the third digital component to consumers at a price corresponding to the third revenue value, to allocate a first portion of the third revenue value to the first party, the value of the first portion corresponding to the inherited first revenue value, and to allocate a second portion of the third revenue value to the second party, the value of the second portion corresponding to the inherited second revenue value.

12. The apparatus as claimed in claim 11 wherein the second digital component is derived from the first digital component.

13. The apparatus as claimed in claim 11 wherein the first digital component is a parent of the second digital component.

14. The apparatus as claimed in claim 11 wherein the first revenue value is reduced by a pre-determined percentage.

15. The apparatus as claimed in claim 11 wherein the second revenue value is reduced by a pre-determined percentage.

16. The apparatus as claimed in claim 11 wherein the third revenue value is reduced by a pre-determined percentage.

17. The apparatus as claimed in claim 11 further including:
a fourth processing module to provide a fourth revenue value associated with the third digital component, the fourth revenue value being a retail price associated with the third digital component, the retail price being the third revenue value multiplied by a profit multiplier.

18. The apparatus as claimed in claim 11 further including:
a fourth processing module to provide a fourth revenue value associated with the third digital component, the fourth revenue value being a retail price, wherein the fourth revenue value is computed based on the third revenue value.

19. The apparatus as claimed in claim 11 wherein an identity of a parent of the second digital component is specified via a user interface.

20. The apparatus as claimed in claim 11 wherein the second digital component has a plurality of parents.

* * * * *